United States Patent [19]

Dankel et al.

[11] 3,713,284
[45] Jan. 30, 1973

[54] SWEEPER FOR GARDEN TRACTOR HAVING IMPROVED HITCH LINKAGE

[75] Inventors: Douglas D. Dankel; Norman O. Buckhouse, both of Kankakee, Ill.

[73] Assignee: Roper Corporation, Kankakee, Ill.

[22] Filed: Jan. 10, 1972

[21] Appl. No.: 216,703

[52] U.S. Cl. .......................56/364, 15/83, 56/14.8, 56/16.1, 56/16.3, 180/53 C
[51] Int. Cl. .............................................A01d 87/08
[58] Field of Search........56/344,364, 201, 202, 16.6, 56/14.8, 15.9, 16.1, 16.3, 15.8, 15.6; 15/79, 83; 180/53 C

[56] References Cited

UNITED STATES PATENTS

| 2,769,295 | 11/1956 | Northcote | 56/15.8 |
| 2,974,472 | 3/1961 | Gebhart | 56/15.9 X |
| 3,493,987 | 2/1970 | Longnecker | 56/16.6 X |

Primary Examiner—Louis G. Mancene
Assistant Examiner—J. N. Eskovitz
Attorney—C. Frederick Leydig et al.

[57] ABSTRACT

A hitch for cantilevered support of a lawn sweeper on a tractor in which a vertically extending support member is mounted upon the tractor having a trailingly pivoted parallelogram-type hitch linkage pivoted to the frame of the sweeper. The lower links are downwardly angled so that the weight of the sweeper is effective to bring drive wheels on the sweeper into engagement with the backsides of the tractor rear wheels and so that when the draft linkage is raised there is a horizontal component to effect disengagement or "throw-off" of the drive wheels from the tractor wheels. Elevator linkage is provided for swinging the draft linkage upwardly and latching it into upraised transport position. For adjusting the working ground clearance of the brush, the supporting member is vertically movable with respect to the tractor and a jack screw is provided on the supporting member for locating it in a desired vertical position. A limit stop interposed between the sweeper frame and tractor limits the degree of indentation of the drive wheels into the tires on the rear wheels of the tractor.

10 Claims, 5 Drawing Figures

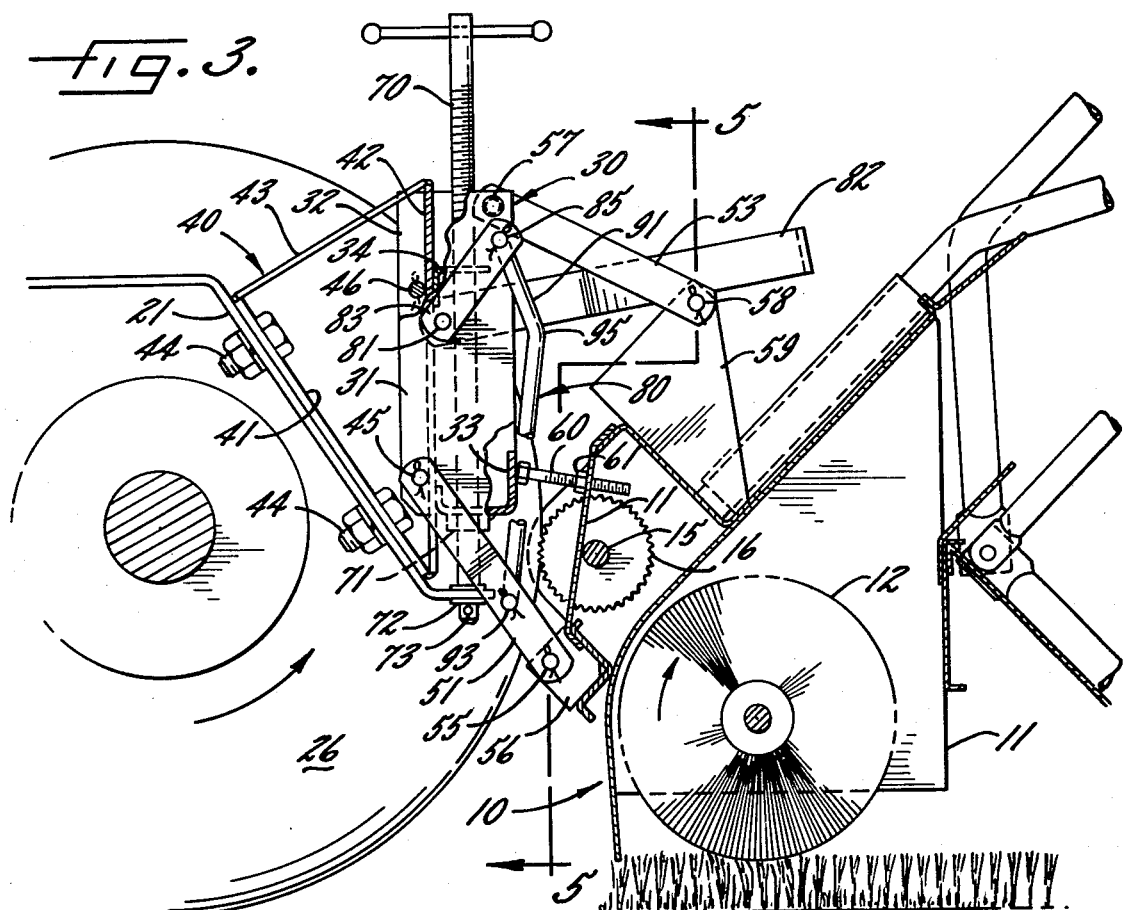
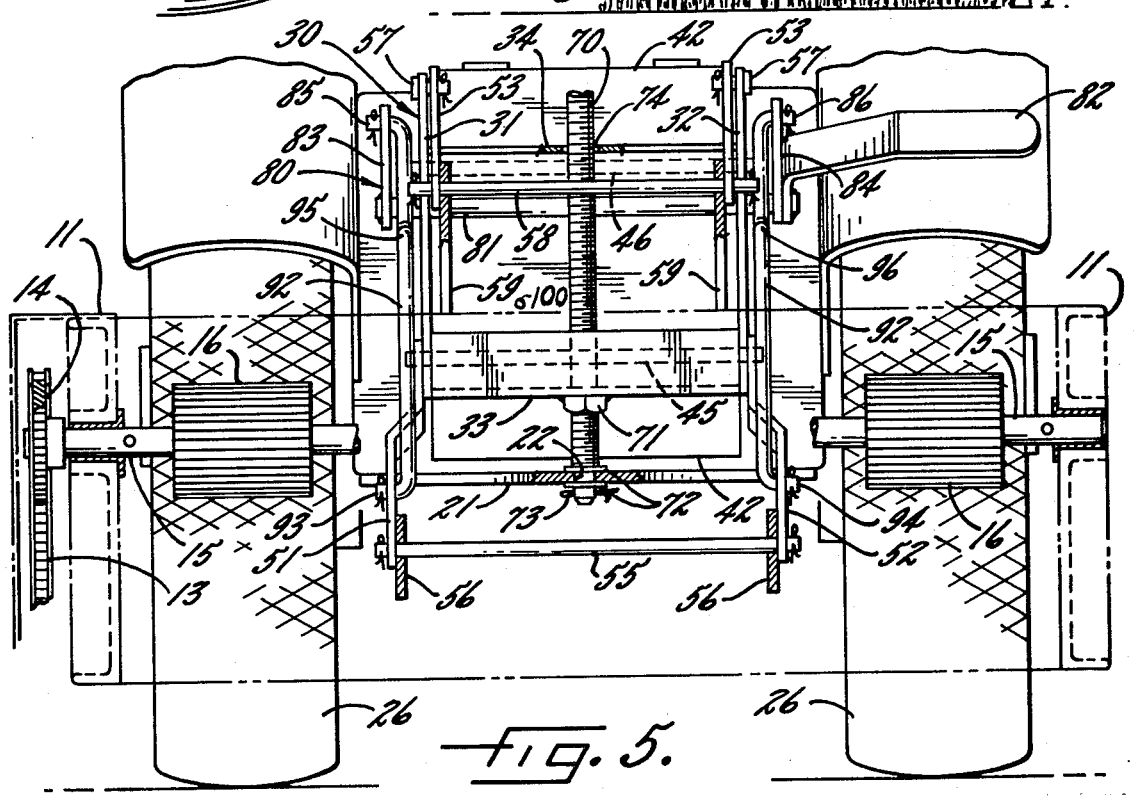

SWEEPER FOR GARDEN TRACTOR HAVING IMPROVED HITCH LINKAGE

In prior U.S. Pat. No. 3,493,987-Longnecker there is described a sweeper which is supported cantilever-fashion upon a tractor with provision for driving the sweeper brush by the tractor rear wheels.

It is an object of the present invention to provide an improved linkage between the tractor and the sweeper which permits the sweeper to occupy an adjustable working position with respect to the ground and which permits the sweeper to be swung both upwardly and rearwardly into an idle transport position simultaneously breaking the drive connection.

It is another object of the present invention to provide means for manually raising the draft linkage for transport of the sweeper and for lowering the draft linkage to establish a working condition easily and conveniently while the tractor operator remains in the driver's seat. It is a related object to provide means for conveniently adjusting the working ground clearance of the sweeper brush also without necessity for the operator's leaving his seat.

It is still another object of the present invention to provide a hitch linkage for a cantilever-supported sweeper which forms a unitary or self-contained assembly with the sweeper and which is easily susceptible to use with tractors of different structure and design. It is nonetheless an object of the invention to provide a hitch linkage which permits convenient disconnection of the hitch linkage at the sweeper frame where the tractor is to be used alone or where it is desired to employ the linkage with other driven, cantilever-supported implements.

It is yet another object of the present invention to provide a hitch linkage for a sweeper which is highly efficient, which permits easy adjustment and throw-off but which is nonetheless simple and inexpensive in construction, combining durability with ease of manufacture and assembly, and which is capable of operating indefinitely without any maintenance except for a few drops of oil.

Other objects and advantages of the invention will become apparent upon reading the attached detailed description and upon reference to the drawings in which:

FIG. 3 is a vertical section looking along the line 3—3 in FIG. 2 and showing the sweeper in working position.

FIG. 5 is a broken vertical section looking along the line 5—5 in FIG. 3.

Figure 1:
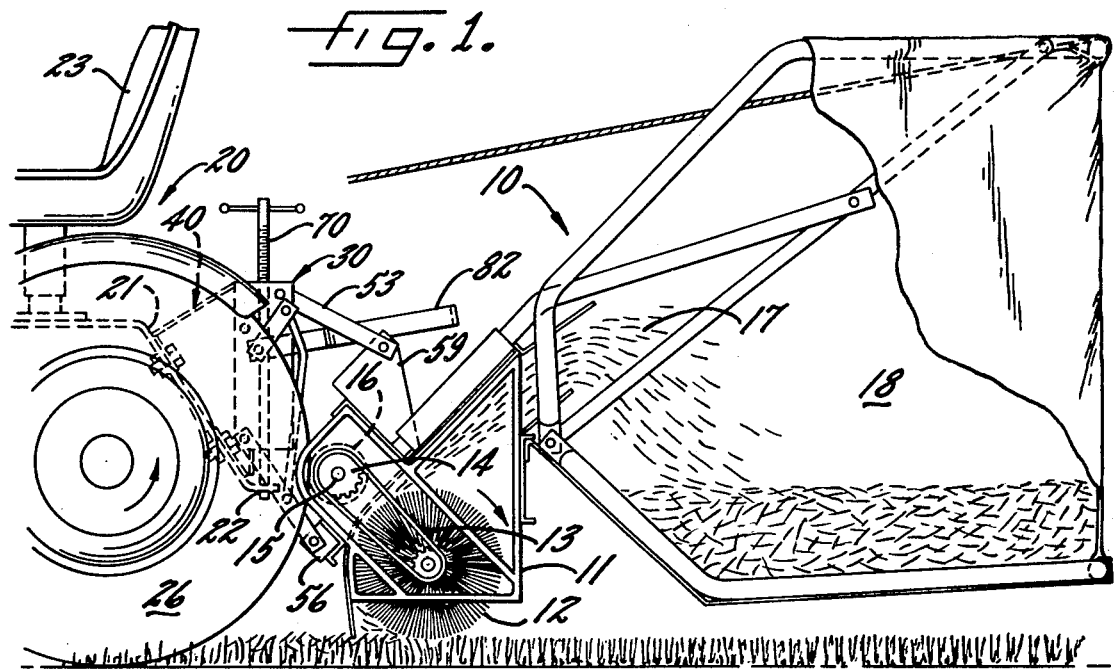
FIG. 1 is a side elevation showing a hitch linkage constructed in accordance with the present invention and with the sweeper in partial section.
Figure 2:
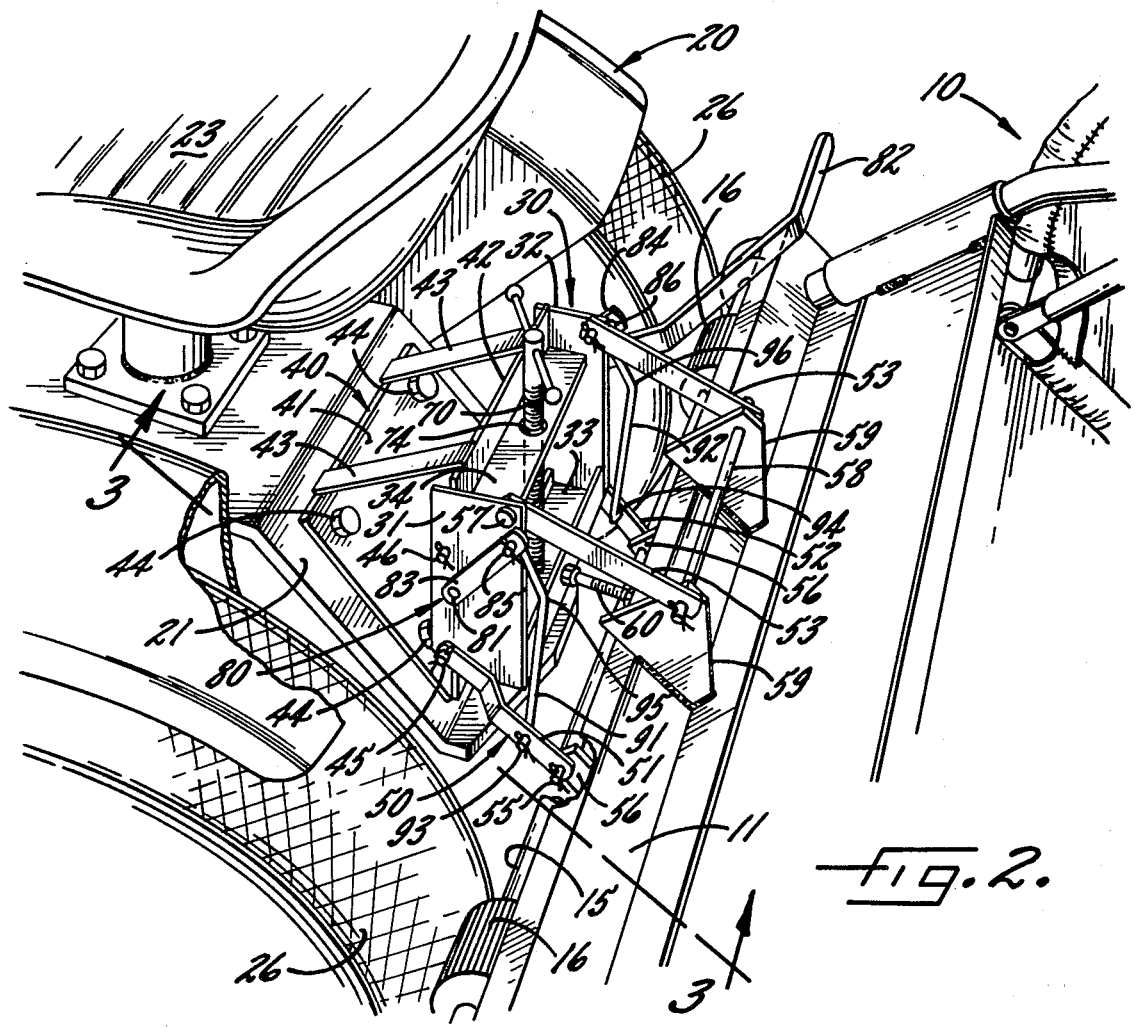
FIG. 2 is a perspective close-up of the hitch linkage.

While the invention has been described in connection with a preferred embodiment, it will be understood that we do not intend to be limited to the particular embodiment shown but intend, on the contrary, to cover the various alternative and equivalent constructions included within the spirit and scope of the appended claims.

Turning now to the drawings there is disclosed a sweeper 10 having a frame 11 in which is journaled a cylindrical brush 12. The structure and operation of the sweeper is described in some detail in the Longnecker patent mentioned above. It will suffice to say that the brush 12 is driven by a sprocket chain 13 which is trained about a sprocket 14 on a transverse elevated drive shaft 15. Mounted upon the drive shaft 15 are a pair of drive wheels 16 which engage the tires on the rear wheels of the tractor upon which the sweeper is mounted.

With the brush rotating clockwise, the clippings and other debris 17 picked up by the brush are discharged into a cantilever-supported receptacle 18.

The tractor 20 of which only the rear end is shown, will be understood to be a conventional garden tractor, or a light agricultural tractor, having a frame which includes a a frame plate 21 which slopes rearwardly and downwardly terminating at a hitch point opening 22. Mounted upon the rear portion of the frame is a seat 23 for the operator. The rear end of the tractor has the usual rubber-tired, ground engaging wheels 26 which are respectively engaged by the drive wheels 16 on the sweeper frame for driving of the brush 12 in the direction shown as the tractor moves ahead.

In accordance with the present invention a vertically extending support member is provided which is mounted upon a bracket at the rear end of the tractor and which serves as a mount for a parallelogram-type draft linkage consisting of a pair of lower links and an upper link, or links, which are pivoted at their trailing ends to the sweeper frame. The lower links are downwardly angled so that under operating conditions the weight of the sweeper produces a forward component of movement and pressure, pressing the drive wheels respectively against the backsides of the rear wheels of the tractor and so that when the lower links are raised there is a rearward component of movement for disengaging the drive wheels as the sweeper and its brush are moved into an idle transport position.

Thus, turning to the drawings, the vertically extending support member, shown at 30, is of boxy shape, being formed of a pair of side plates 31, 32 which are laterally spaced parallel to one another and which are rigidly joined by transverse members 33, 34. The members 33, 34 may be of any desired cross section, but it is preferred to make the member 33 of channel shape while the member 34 is formed of angle stock, both of the members being butt-welded to the side plates.

For mounting the supporting member 31 on the tractor, a bracket 40 is preferably used made up of a mounting plate 41 and face plate 42 which are arranged in open "V" formation and with their top edges secured together by one or more braces 43 which are welded in place. The mounting plate 41 is preferably secured to the tractor frame plate 21 by means of bolts 44. The face plate 42 is dimensioned for slidable fit between the side plates 31, 32 of the support so that the support may be vertically adjustable. The support is held captive against the face plate 42 of the bracket by a pair of transversely extending pins which include a lower pin 45 which penetrates the side plates and an upper pin 46, both of the pins kept in position by cotter pins or the like at the opposite ends.

Turning now to the draft linkage, indicated generally at 50, it includes a pair of lower links 51, 52 and an upper link, or links 53, the links being trailingly pivoted in more or less parallelogram orientation. The lower links 51, 52 are preferably pivoted at their forward ends to the transversely extending pin 45 previously referred to. At their trailing ends the links 51, 52 are pivoted to a transversely extending pin 55 which penetrates brackets 56 which are welded to the lower forwardly facing portion of the sweeper frame. The upper link is formed in two pieces 53 pinned at 57 to the side plates at the upper end portion of the support 30. At their rear ends, the link members 53 are pivoted to the ends of a transverse pin 58 which engages brackets 59 which are welded in spaced positions to the front end of the sweeper frame in positions above the brackets 56. The lower links 51, 52 are preferably downwardly angled by an amount which, under working conditions, may be on the order of 45° as shown in FIGS. 1 and 3, so that the weight of the sweeper, acting upon the linkage, has both a downward component and a forward component of force and movement, thereby bringing the drive wheels 16 on the sweeper forcibly against the backsides of the tires on the rear wheels of the tractor. The drive wheels 16 are preferably corrugated or ridged so that when they indent into the rubber of the tires any slippage, with consequent wear, is avoided even at high levels of reaction torque. For the purpose of limiting the normal force between the drive wheels 16 and the tractor tires, in other words, to control the amount that the drive wheels 16 indent the tires, an adjustable stop is provided which limits the degree of forward movement of the sweeper frame with respect to the frame of the tractor. In the present instance this is accomplished by a bolt 60 having a nut 61 which is welded or otherwise secured to the sweeper frame 11. The bolt is so mounted that its head engages the near side of the lower transverse member 33 of the support 30. Since the member upon which the bolt 60 is mounted and the member which it engages are interconnected by the links 51–53, it will be apparent that the stop will be effective to perform its limiting function regardless of the vertical position of the support 30.

It is one of the features of the present invention that means, easily accessible from the seat of the tractor, are provided for adjusting the vertical position of the support 30, and hence the vertical position of the sweeper frame and brush with respect to the ground, to provide the optimum sweeping height under various conditions which may be encountered. This is accomplished in the present instance by providing a jack screw 70 which is threaded into a nut 71 which is secured to the transverse member 33 of the support, by welding or the like, with the lower end of the jack screw being seated with respect to the frame of the tractor. Preferably, the lower end of the jack screw is captive within the opening 22 on the plate 21 which serves as the tractor hitch point connection. Captivity may be provided by a pair of washers 72 sandwiching the plate 21 and held in place by a suitable pin 73 in the tip of the jack shaft. At its upper end the jack screw passes through a clearance hole 74 formed in the transverse member 34. It will be apparent, then, that when the jack screw is turned in one direction the support 30 is gradually lowered, lowering the brush closer to the ground while preserving the orientation of the sweeper and without effecting the drive connections. Turning the screw in the opposite direction causes the brush to be raised and hence the amount of ground clearance to be increased. The adjustment, when set, remains fixed in spite of the shock and vibration to which the screw might be subjected.

Figure 4:
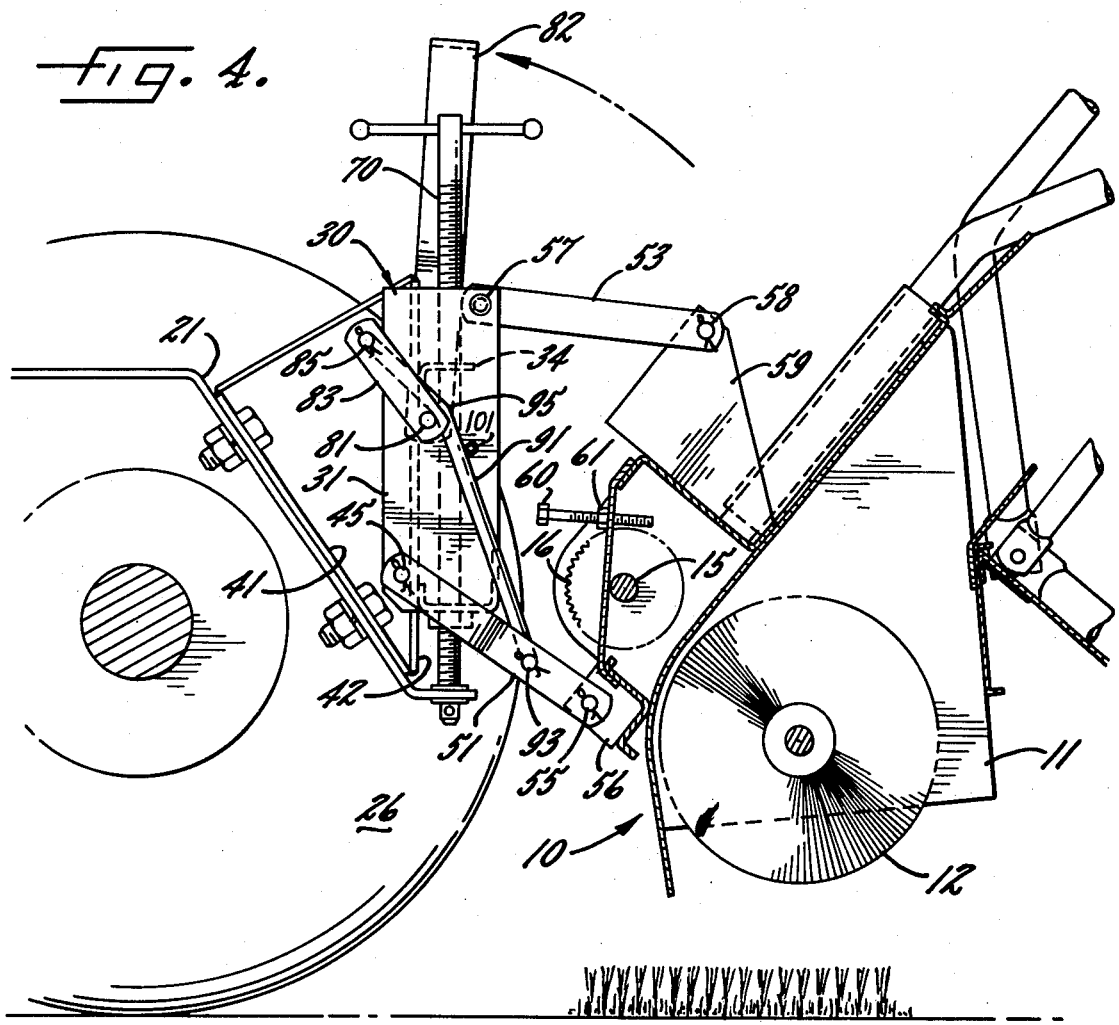
FIG. 4 is a view similar to FIG. 3 but showing the sweeper in its upraised transport position.

In carrying out the present invention an elevator linkage is provided for raising the draft linkage and for latching the same in upraised position. The elevator linkage, indicated generally at 80, includes a transverse elevator shaft 81 having an operating lever or arm 82 and to which are secured separate cranks 83, 84. The cranks have pivot connections 85, 86 with drop links 91, 92 which, in turn, have pivot connections 93, 94 at their respective lower ends. The cranks 83, 84 are so oriented so that they pass over-center when the links 51, 52 are at their upper limit of movement. To stop the movement of the cranks in slightly over-center position, the drop links 91, 92 are formed of dog-leg shape, being bent at 95, 96 respectively to interfere with and bear against the elevator shaft 81 as shown in FIG. 4. Because of the downward angling of the draft links 51, 52, raising them is accompanied by horizontal rearward movement of their trailing ends so that the sweeper frame is, incident to raising, swung away from the tractor frame, thereby breaking the connection between the drive wheels 16 and the tractor tires 26 and silencing the brush.

The operating arm 82 is preferably phased with respect to the elevator shaft 81 so as to be in a generally horizontal position when the sweeper is lowered. This, combined with the effective length of the arm provides good mechanical advantage for initiating the raising movement. As the cranks 83, 84 are rocked progressively toward the vertical position their mechanical advantage increases. Thus only modest force need be exerted by the operator over the lifting stroke to elevate the sweeper to its idle or transport position. Once the cranks 83, 84 are moved over-center they become detented so that the sweeper remains in its elevated position without any risk of accidental dropping. To move the sweeper back into working position all that is necessary is to reverse the stroke of the operating arm. Because of the location of the operating arm the raising and lowering movements are both more efficiently done with the operator seated in the driver's seat than standing on the ground.

When the receptacle 18 becomes filled, the receptacle is simply tipped forwardly for discharge as described and illustrated in the patent mentioned above.

When it is desired to temporarily disconnect the sweeper, this is accomplished by slipping out of place the lower and upper pins 55,58, respectively, which secure the rear ends of the draft links to the sweeper frame. This can be quickly accomplished and the linkage is then available for attaching other implements, having suitably spaced hitch points, to the tractor. Or, if desired, the hitch assembly may be removed from the tractor as a self-contained unit with the sweeper. To accomplish this the pins 45,46 which hold the support 30 captive with respect to the bracket face plate 42 are simply removed and the lower end of the jack screw is unstepped from the hitch point 22 upon removal of the cotter pin 73. This frees such hitch point for connection of other pull-behind implements, and the bracket 40 may be permitted to remain bolted to the tractor frame.

A still further mode of disconnection is to unstep the jack screw from the tractor hitch point 22, without removing the support member 30 and with the support member being slid upwardly along the face plate 42 to an out-of-the-way position. To hold the support member 30 upraised, a hole 100 (FIG. 5) may be provided in the face plate into which a bolt or pin may be inserted for engagement by the underside of the lower transverse member 33. Similarly a pair of alined holes 101 may be bored in the side plates 31, 32 (FIG. 4) for reception of a bolt or pin to lock the drop links 91,92 in their upraised positions. The pin which is inserted in the holes 101 may, for example, be one of the pins 55, 58.

It will be apparent that the above described hitch assembly contributes substantially to the versatility and ease of usage of the sweeper. Not only may the brush height be quickly adjusted in accordance with ground conditions right from the driver's seat, but the sweeper may be effectively disengaged, and the brush silenced, simultaneously with raising the brush clear of the ground, which is desirable, for example, when traversing a gravel driveway or other area where sweeping is neither necessary or desirable. The parallelogram linkage, with its relatively widely spaced point of attachment, provides vertical and horizontal stability while nevertheless permitting slight lateral swing of the sweeper frame and the transverse shaft which is carries, so as to equalize the pressure exerted by the drive wheels 16 against the tractor tires.

It will be apparent that while the hitch is particularly intended for use with the disclosed lawn sweeper, the term "lawn sweeper" as used herein is not limited to a sweeper or particular design thereof but is intended to cover small tractors intended especially for garden usage as well as light agricultural tractors.

What is claimed is:

1. In a combination tractor and hitched lawn sweeper including rubber-tired rear wheels on said tractor, the lawn sweeper having a frame carrying a cylindrical brush rotatably driven by elevated drive wheels journaled in the frame and engageable with the rear wheels of the tractor: the improvement comprising a hitch for cantilevered support of said lawn sweeper, said hitch including a vertically extending support member, means including a bracket on the tractor for holding the support member captive for vertical sliding movement, a parallelogram-type draft linkage including a pair of trailingly pivoted laterally spaced lower links together with an upper link, the links being pivoted at their forward ends to the support member and at their trailing ends to the frame of the sweeper, the lower links being downwardly angled so that the weight of the sweeper produces a forward component of movement and pressure pressing the drive wheels respectively against the back sides of the rear wheels of the tractor under driving conditions and so that when the lower links are raised there is a rearward component of motion disengaging the drive wheels as well as an upward component for raising the frame and brush clear of the ground, means for adjusting the vertical position of the support member on the bracket for vertical bodily movement of the draft linkage to adjust the degree of ground clearance of the brush when the draft linkage is in lowered position, elevator linkage including a manual lever pivoted on the support member and connected to the draft linkage for raising the same, and means for latching the draft linkage in upraised position.

2. The combination as claimed in claim 1 in which an adjustable stop is provided for limiting the degree of forward swing of the sweeper frame with respect to the tractor thereby to limit the degree of indentation of the drive wheels into the rear wheels of the tractor.

3. The combination as claimed in claim 1 in which the elevator linkage includes a transversely extending elevator shaft in the support member having spaced cranks and drop links connecting the cranks and draft linkage so arranged that when the draft linkage swings to an upper limit position the crank swings over-center for latching the draft linkage and frame of the sweeper in upraised position.

4. The combination as claimed in claim 1 in which the elevator linkage includes a shaft journaled transversely in the support member, such shaft having cranks at its respective ends and each crank having a drop link for connecting the same to the adjacent lower draft link, the cranks being so phased that when the lever is swung upwardly the upper ends of the drop links move over-center with respect to the transverse shaft, and stop means for limiting the amount of over-center movement so that the draft linkage remains latched in upraised position until intentionally lowered by the manual lever.

5. The combination as claimed in claim 4 in which the stop means is in the form of interference between the drop links and the transverse elevator shaft and in which the drop links are each formed in dog-leg shape to permit over-center movement of the upper ends thereof.

6. The combination as claimed in claim 1 in which the support member is of box shape formed of a pair of vertical side members arranged parallel to one another and rigidly interconnected by a pair of transverse members, the back of the support member forming a recess between the side members for snugly receiving the bracket on the tractor for vertical sliding movement, means on the side members for holding the bracket captive during the sliding movement, and threaded means effectively interposed between the supporting member and the bracket for adjusting the vertical position of the supporting means.

7. The combination as claimed in claim 1 in which the adjusting means is in the form of a jack screw threaded into the supporting member and reacting against the frame of the tractor.

8. The combination as claimed in claim 1 in which the pivots at the trailing ends of the draft links are disengageable from the frame of the sweeper for uncoupling the same from the tractor.

9. The combination as claimed in claim 6 in which the means for holding the support member captive on the bracket is disengageable to permit the combined hitch linkage and sweeper to be removed from the tractor thereby freeing the rear end of the tractor for use with other implements.

10. The combination as claimed in claim 1 in which the tractor has a hitch point and in which the means for adjusting the vertical position of the support member includes a jack screw supported at the hitch point, means for maintaining the support member and jack screw in upraised position with respect to the bracket thereby to free the hitch point for connection of other drawn attachments.

* * * * *